Patented Nov. 13, 1934

1,980,429

UNITED STATES PATENT OFFICE 1,980,429

COLORATION OF MATERIALS MADE OF OR CONTAINING CELLULOSE OR CELLULOSE DERIVATIVES

Reginald Henry Parkinson, Spondon, near Derby, England, assignor to Celanese Corporation of America, a corporation of Delaware No Drawing. Application October 15, 1930, Serial No. 488,999. In Great Britain November 8, 1929

16 Claims. (Cl. 8—13)

This invention is a continuation in part of U. S. application S. No. 488,998, filed on even date herewith corresponding with British application No. 33,797/29 filed 6th November, 1929 and relates to improvements in the coloration of filaments, threads, yarns, ribbons, fabrics, films or other materials made of or containing cellulose or cellulose acetate or other esters or ethers. In particular the invention relates to new processes for the mordant dyeing of such materials.

In the said U. S. application S. No. 488,998, filed on even date herewith corresponding with British application No. 33,797/29 processes are described for introducing inorganic substances into materials made of or containing cellulose or cellulose acetate or other cellulose esters or ethers by treating the materials with suspensions, dispersions or colloidal solutions, preferably aqueous, of inorganic substances. The said application states that the substances should be white or substantially white.

I have now found that the said processes may be used to incorporate in the materials mordants, and the present invention has as its object the utilization of the process in mordant dyeing. According to the present invention materials made of or containing cellulose or cellulose acetate or other esters or ethers of cellulose are mordant dyed by processes involving mordanting with suspensions, dispersions or colloidal solutions of mordant metal oxides or compounds.

Since the color of the material treated according to the present invention is dependent upon the lake color formed between the mordant and the mordant dyestuff, it will be apparent that it is immaterial whether the mordant itself is white or not. The mordants may, for example, be oxides or hydrated oxides of titanium, zinc, aluminium, chromium, iron, cerium or tin. The mordants may be applied by any of the processes described in the said application. As in the said application, the colloidal solutions, suspensions or dispersions are preferably aqueous and are preferably such that the colloidal or dispersed particles have a charge opposite in sign to that of the material under treatment. Whether or not this is the case, absorption of the particles within the material under treatment and/or coagulation within the materials may be accelerated or initiated by any desired means, such as by heat, by electrical means or by means of electrolytes or other coagulants and/or by previous or simultaneous treatment of the material with a swelling agent therefor.

The actual dyeing of the material may be effected by any methods suitable for the application of mordant dyestuffs. Where the materials under treatment have, as in the case with cellulose esters and many of the mordant dyestuffs, a substantive affinity for the dyestuffs to be applied, the latter may be applied before the actual mordanting. Alternatively, the mordant dyestuffs may be applied to the materials after mordanting, whether or not they have a substantive affinity therefor. For local coloration any suitable means of local application may be employed. In the case of dyestuffs having little or no substantive affinity for the material, a local application of the mordant and a uniform application of the dyestuffs may be adopted. In the case of uniform mordanting, local application of the dyestuff in paste or other form, for example by printing or stencilling, may be used.

Any desired natural or synthetic mordant dyestuffs may be used for the purpose of the present invention, for example hæmatein, fustic, Persian berries, alizarin or other mordant dyes of the anthraquinone series, gallocyanines and the ortho-oxy-azo dyestuffs.

The processes of the present invention are particularly applicable to the treatment of materials made of or containing cellulose esters or ethers, for example cellulose acetate, cellulose formate, cellulose propionate, cellulose butyrate, "immunized cotton", methyl cellulose, ethyl cellulose or benzyl cellulose, but may also be applied to the treatment of materials made of or containing cotton or other cellulosic materials, e. g. materials made from viscose, cuprammonium solutions of cellulose or nitrocellulose. Mixed materials containing cellulose esters or ethers and/or cellulose in admixture with other fibres, for instance silk or wool, may likewise be treated.

The following examples show the best methods known to us for carrying the invention into effect, but they are not to be considered as limiting it in any way.

Example 1

A solution of titanium sulphate containing about 5% $TiO_2$ is well cooled by adding ice and a cool 5% solution of caustic soda run in slowly with thorough stirring until the liquor is just alkaline, the temperature being kept low, for example under 5° C., during the addition. The precipitated hydroxide is separated from the liquor and thoroughly washed using several changes of water. It is then drained or pressed off until a paste is obtained containing about 20% of $TiO_2$. To this paste concentrated hydrochloric acid is added to the extent of 1 to 2% of HCl on the weight of the TiO₂, the addition being carried out with thorough stirring. The whole is then heated to a temperature of 80 to 100° C. when it gelatinizes and may become translucent. If desired or requisite, a further quantity of hydrochloric acid may be added to facilitate dispersion. The dispersed mass is then diluted with water to give a sol containing about 5% of TiO₂. Into the bath thus obtained cellulose acetate yarn or fabric is entered, for example into a bath six times the weight of the goods. The goods are treated in the bath at a temperature of about 60° C. for 10 minutes to half an hour, or until the required quantity of titanium oxide has been absorbed. The goods are then lifted and washed, and are dyed for one hour at 70 to 75° C. with 10 per cent. of hæmatein crystals. A full black is thereby produced on the goods.

In a similar manner the goods may be dyed with 1 to 2 per cent of their weight of anthracene blue WG new (Color Index No. 1061), of gallocyanine or of alizarin orange or alizarin yellow.

Example 2

An aluminium sol is prepared in the manner described in Example 1, but using aluminium sulphate instead of titanium sulphate. The goods are entered as described in Example 1 into a bath containing about 4 to 8% of dispersed Al₂O₃ and treated therein at a temperature of 50 to 70° C. until the required absorption is obtained. The goods are then dyed by treatment for one hour at 70 to 75° C. in a bath containing 7½% of alizarin (20% paste) and one per cent of calcium acetate. The goods are then soaped and finished and dried as required; the bright red aluminium lake shade is thus obtained.

Example 3

A solution of alum containing about 22.5 gms. of Al₂O₃ per litre is precipitated with aqueous ammonia, the precipitate filtered, washed and covered with about 200 times its weight of water. The whole is brought to the boil and N/20 aqueous hydrochloric acid added slowly in a total quantity equal to about a tenth of the weight of the liquor. An opalescent liquor is obtained.

Cellulose acetate yarn or fabric or cotton or viscose yarn or fabric is entered into the bath obtained and treated therein for 20–30 minutes, the temperature being slowly raised if desired. The goods are lifted, rinsed and dyed with 1–2% of acid green at a temperature of 50–70° C. for one hour.

What I claim and desire to secure by Letters Patent is:—

1. In the mordant dyeing of material containing an organic substitution derivative of cellulose, the step of applying a metallic oxide mordant to the material directly from a colloidal solution of said metallic oxide.

2. In the mordant dyeing of material containing cellulose acetate, the step of applying a metallic oxide mordant to the material directly from a colloidal solution of said metallic oxide.

3. In the mordant dyeing of material containing cellulose acetate, the step of applying a metallic oxide mordant to the material directly from a colloidal solution of said metallic oxide in the presence of a swelling agent for the material.

4. In the mordant dyeing of material containing cellulose acetate, the step of applying a metallic oxide mordant to the material directly from a colloidal solution of said metallic oxide, the dispersed particles of which have a charge opposite in sign to the material treated.

5. In the mordant dyeing of material containing cellulose acetate, the step of applying titanium oxide to the material directly from a colloidal solution of said titanium oxide.

6. In the mordant dyeing of material containing cellulose acetate, the step of applying aluminum oxide to the material directly from a colloidal solution of said aluminum oxide.

7. Process of mordant dyeing material containing organic substitution derivatives of cellulose which comprises the operations of applying a mordant dyestuff to the material and of applying a metallic oxide mordant to the material by treating the latter with a colloidal solution of said oxide.

8. Process of mordant dyeing material containing an organic substitution derivative of cellulose which comprises mordanting the material with a metallic oxide mordant by treating the same with a colloidal solution of a mordant metal oxide and thereafter coloring with mordant dyestuffs.

9. Process of mordant dyeing material containing cellulose acetate which comprises the operations of applying a mordant dyestuff to the material and of applying a metallic oxide mordant to the material by treating the latter with a colloidal solution of said oxide.

10. Process of mordant dyeing material containing cellulose acetate which comprises mordanting the material with a metallic oxide by treating the same with a colloidal solution of a mordant metal oxide and thereafter coloring with mordant dyestuffs.

11. Process of mordant dyeing material containing cellulose acetate which comprises applying a metallic oxide mordant to the material by treating the same with a colloidal solution of a mordant metal oxide, the dispersed particles of which have a charge opposite in sign to the material treated, and thereafter coloring with the mordant dyestuffs.

12. Process of mordant dyeing material containing cellulose acetate which comprises applying a metallic oxide mordant to the material by treating the same with a colloidal solution of a mordant metal oxide in the presence of a swelling agent for the material, and thereafter coloring with mordant dyestuffs.

13. Process of mordant dyeing material containing cellulose acetate which comprises applying titanium oxide to the material by treating the same with a colloidal solution of titanium oxide and applying mordant dyestuffs.

14. Process of mordant dyeing material containing cellulose acetate which comprises applying aluminum oxide to the material by treating the same with a colloidal solution of aluminum oxide and applying mordant dyestuffs.

15. Process of mordant dyeing material containing cellulose acetate which comprises applying titanium oxide to the material by treating the same with a colloidal solution of titanium oxide in the presence of a swelling agent for cellulose acetate, and applying mordant dyestuffs.

16. Process of mordant dyeing materials containing cellulose acetate which comprises applying aluminum oxide to the material by treating the same with a colloidal solution of aluminum oxide in the presence of a swelling agent for cellulose acetate, and applying mordant dyestuffs.

REGINALD HENRY PARKINSON.